United States Patent [19]

Mackal et al.

[11] 3,995,653
[45] Dec. 7, 1976

[54] INFLATION DEVICE

[76] Inventors: Glenn H. Mackal, Buena Vista Drive, Ringwood, N.J. 07456; George E. Lardner, Reid Place, Hawthorne, N.J. 07507; Joseph Maz, 305 Linola Vista Ave., North Haledon, N.J. 07508

[22] Filed: Aug. 1, 1975

[21] Appl. No.: 601,032

[52] U.S. Cl. .............................. 137/234; 137/223
[51] Int. Cl.$^2$ ........................................ F16K 15/20
[58] Field of Search .................. 137/232, 233, 234; 46/90

[56] References Cited
UNITED STATES PATENTS

| | | | |
|---|---|---|---|
| 679,519 | 7/1901 | Smith | 137/232 |
| 1,185,684 | 6/1916 | Kraft | 137/234 |
| 1,263,599 | 4/1918 | Poole | 137/232 |
| 3,903,915 | 9/1975 | Rosaz | 137/232 |

*Primary Examiner*—Harold W. Weakley
*Attorney, Agent, or Firm*—Alfred W. Vibber

[57] ABSTRACT

Device for inflating and deflating an inflatable article. The device has a body affixed to a wall of the inflatable article at a hole therethrough, the device having a tubular insert or nipple sealed to the body and a closure element or plug functioning as a stopper for the nipple, the plug being completely removable from the nipple to deflate the article. The plug has threaded engagement with the nipple, and functions as an inflating check valve when the valve is opened by partially unscrewing the plug from the nipple. The check valve is of novel construction, incorporating an annular seat formed integral with the body of the inflation device, a valve element in the form of a diaphragm on the plug cooperating with such annular seat, and a novel means for manually locally unseating the valve element from the annular valve seat when the plug is partially unscrewed from the nipple. The inflation device also incorporates a novel tether for the rotatable plug, the tether permitting free rotation of the plug with respect to the nipple, and the complete removal of the plug from the nipple while retaining it tethered, as during the deflation of the inflatable article.

8 Claims, 7 Drawing Figures

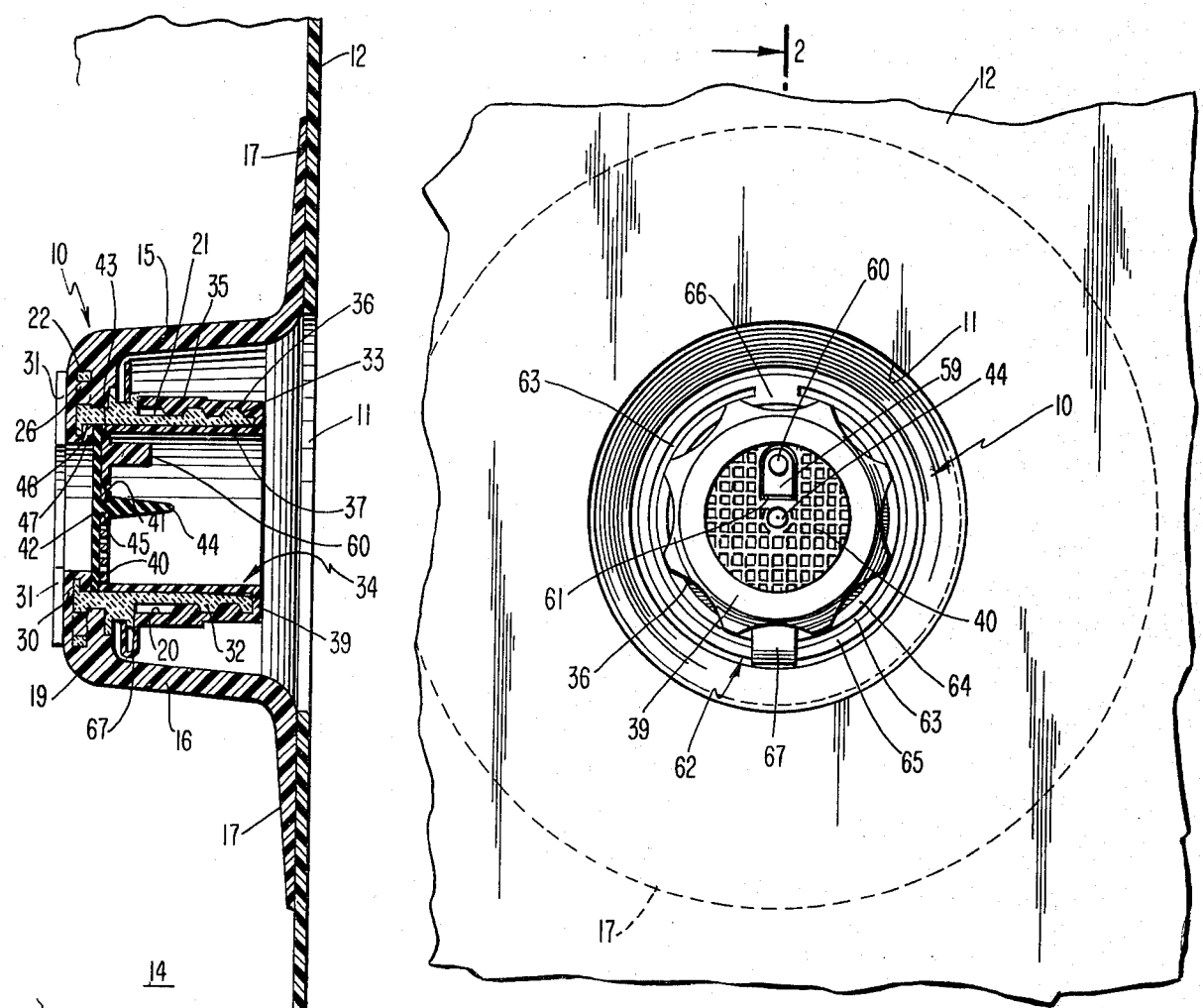
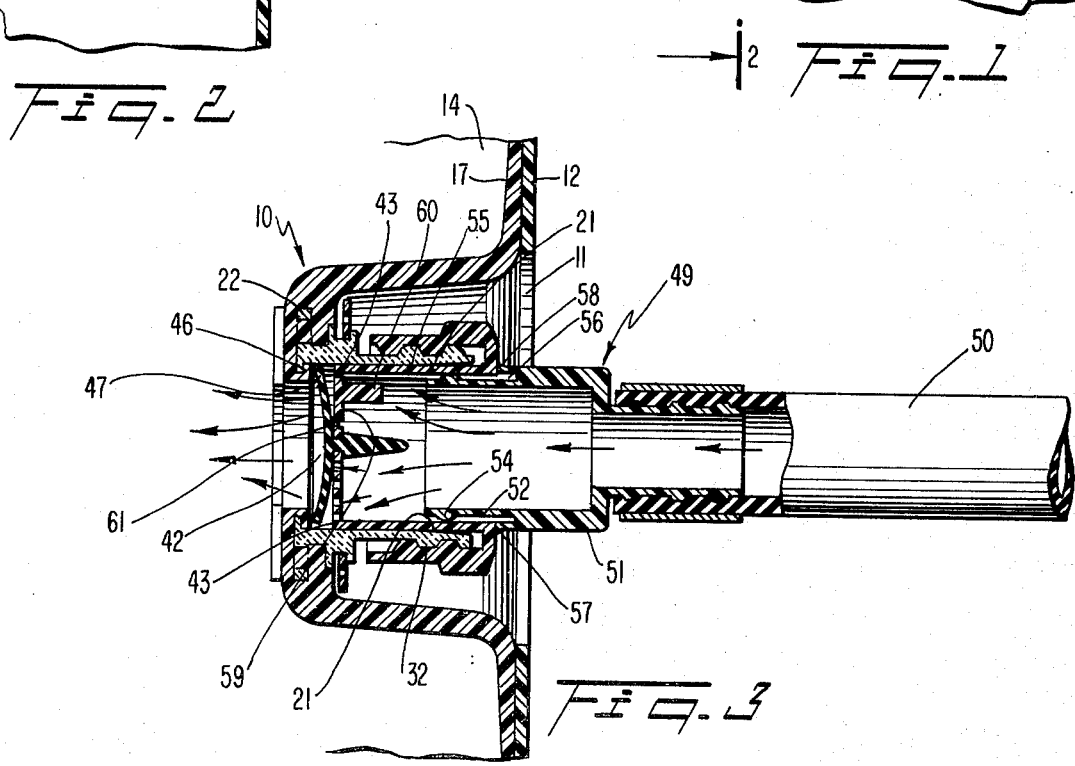

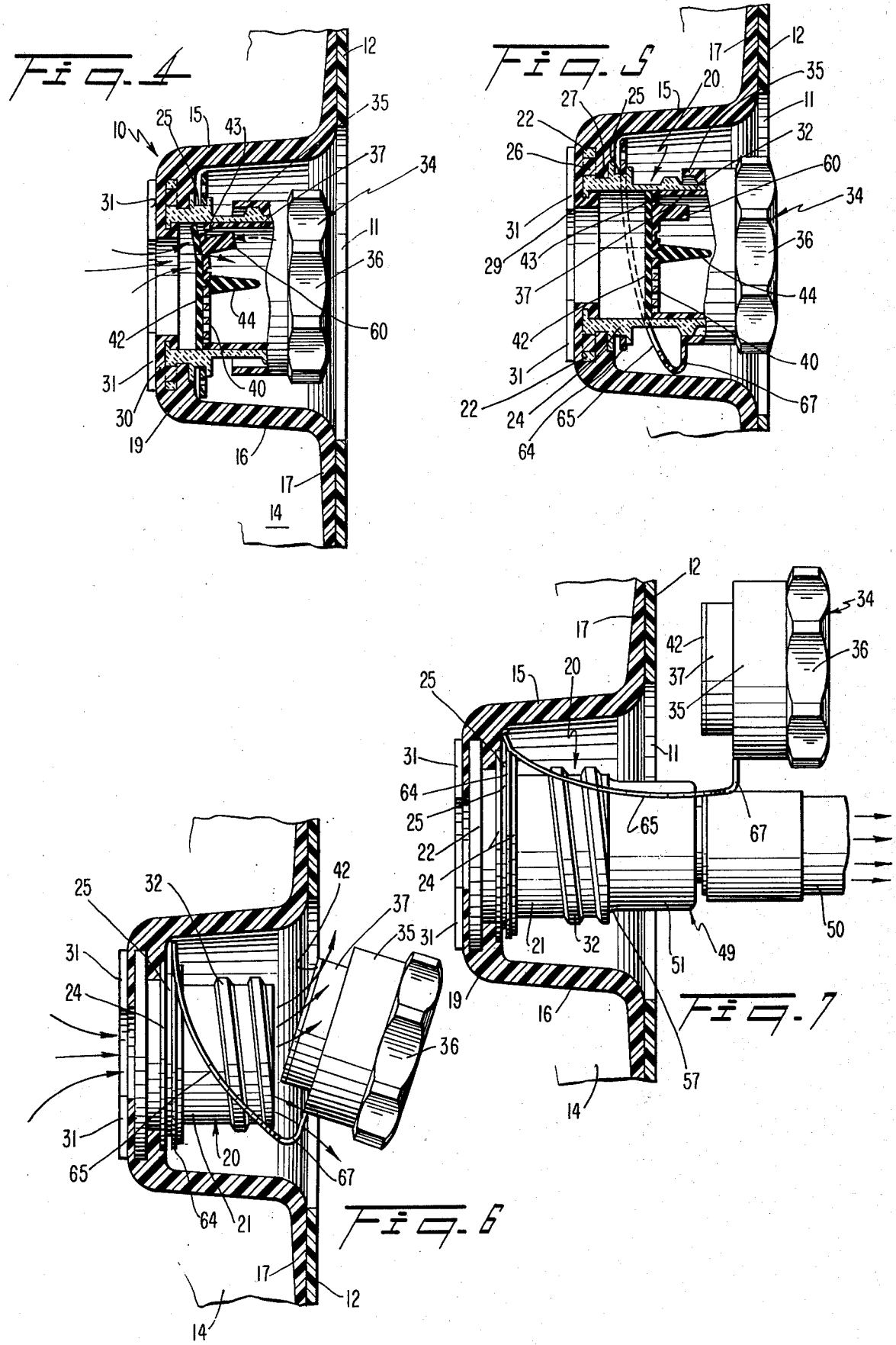

INFLATION DEVICE

This invention relates to a device for inflating and deflating inflatable articles. More particularly, the invention relates to a combined closure and check valve device which is particularly well-adapted for use with inflatable articles of large volume, such as inflatable boats capable of carrying a number of people.

In the illustrative embodiment, the device has a body affixed to a wall of the inflatable article having a hole therethrough, the device having a tubular insert or nipple sealed to the body and a hollow closure element or plug functioning as a stopper for the nipple, the plug being completely removable from the nipple to deflate the article. The plug has threaded engagement with the nipple, and functions as an inflating check valve when the valve is opened by partially unscrewing the plug from the nipple. The inflatable article can be completely deflated by removing the plug from the nipple.

The check valve is of novel construction, the illustrative embodiment thereof incorporating an annular seat formed integral with the body of the inflation device, there being a valve element in the form of a diaphragm on the plug selectively sealingly cooperating with such annular seat. The check valve has novel means for manually locally unseating the valve element from the annular valve seat when the plug is partially unscrewed from the nipple, thereby to exhaust excess air from the inflatable article.

The inflation device also incorporates a novel tether for the rotatable plug, the tether permitting free rotation of the plug with respect to the nipple and thus the complete removal of the plug from the nipple while retaining it tethered, as during the deflation of the inflatable article.

The above and further objects of the invention relating to economies of manufacture and use of the device and advantages thereof will more fully appear upon consideration of the following specification, and of the accompanying drawings forming a part thereof, in which:

FIG. 1 is a view in elevation taken toward the outer end of a preferred illustrative embodiment of the inflation valve device of the invention, the device being shown mounted upon a fragmentarily illustrated portion of the wall of an inflatable article such as an inflatable boat;

FIG. 2 is a view in vertical axial section through the device and the portion of the side wall of the inflatable article on which the device is mounted, the section being taken along the line 2—2 in FIG. 1, the plug of the device being shown in fully closed position;

FIG. 3 is a view similar to FIG. 2 but with the plug of the device shown disposed in its open position and with an inflating fixture connected to a source of air under pressure applied to the device during the act of inflating the inflatable article;

FIG. 4 is a view in vertical axial section through the device and the panel of the inflatable article to which it is attached, the plug being shown in its open position in which the valve element thereof normally functions as a check valve, a portion of the valve element of the check valve being shown manually unseated whereby to exhaust air from the interior of the inflatable article;

FIG. 5 is a view in vertical axial section through the inflation device and the portion of the panel of the inflatable article to which it is secured, the plug being shown in the course of its being further unscrewed from the position thereof which it occupies in FIG. 4;

FIG. 6 is a view similar to FIGS. 4 and 5 but with the plug or check valve portion of the device having been fully removed from the nipple of the device, the air within the inflatable article being thus free for escape through the nipple; and FIG. 7 is a view in vertical axial section through the device with the plug or check valve having been fully removed from the nipple and with the fixture shown in FIG. 3 having been inserted into the nipple and now connected to a source of reduced pressure, whereby fully to exhaust the air from the inflatable article following its deflation so as to facilitate the folding and packing of the inflatable article.

Turning now to the drawings, and particularly to FIGS. 1 and 2 thereof, the inflation valve of the invention, which is generally designated by the reference character 10, is shown sealed to a panel 12 of an inflatable article such as a boat at an opening 11 through such panel. The inflation device 10 is located within the internal space 14 of the article. The outer, main body of the device, which is generally designated 15, has a frusto-conical portion 16, the outer larger diametered end of which is joined to an annular flange 17 which is sealed to the panel 12 as by being vulcanized or adhesively bonded thereto. The body 15 may, for example, be molded of rubber or rubber-like material such as neoprene.

Disposed coaxially of the body 15 and bonded and sealed thereto at the inner end portion 19 of body 15 is an insert sleeve or nipple 20 having an axially outer tubular portion 21 and an axially inner radially outwardly extending annular flange 22. The insert sleeve 20 also has a thickened annular hub 24 disposed thereon and spaced somewhat axially outwardly along the insert from the flange 22. The hub 24 has an annular groove 25 therein intermediate its axial length, groove 25 serving to secure the inner ring portion of a novel tether, to be described, for the removable plug or check valve element of the inflation device.

The flange 22 has a plurality of equally angularly spaced holes 26 therethrough. Extending radially inwardly from the axially inner end of the insert sleeve 20 is an annular flange 29. The body 15 of the inflation device is molded about the insert sleeve or nipple 20 so that rubber or rubber-like material integral with the body 15 extends through the plurality of holes 26 in the flange 22 of the tubular insert, extends downwardly over the rear end of insert 20, axially within the passage through the flange 29 and then radially inwardly to cover the axially inner surface of flange 29 to form an annular valve seat 46. Material of the body 15 also extends into the annular groove 27 formed between the axially outer surface of the flange 22 and the axially inner surface of the hub 24, such material also extending forwardly to the plane of the rear wall of the annular groove 25 in the hub 24. The insert sleeve 20 may be made of any one of a number of metals, for example, aluminum, having the requisite strength and corrosion resistance properties, or from plastic materials. One such latter material may be 40% glass filled nylon made by Liquid Nitrogen Processing Corp. It is additionally desired to point out that the body 15 of the inflation device may also be made, for example, of polyvinylchloride or polyurethane as well as the above-mentioned rubber and rubber-like materials.

In the preferred embodiment of the device, the body 15 is provided on its axially inner end with an axially shallow central annular boss 30 having a plurality of equally angularly spaced radial slots 31 therein. The slots 31 provide for the free passage of air into and out of the central passage at the axially inner end of the body 15 even though an opposing panel of the inflatable device should be in snug engagement with the axially inner end of the body 15.

The nipple 20 is provided with external threads 32 extending from its axially outer end, threads 32 cooperating with internal threads 33 on an outer skirt 35 on a hollow plug or valve member generally designated 34. The outer surface of skirt 35 is scalloped or fluted at 36 to provide an effective grip thereon. The plug 34 is further provided with an inner skirt or sleeve 37 which is disposed coaxial of the outer sleeve 35 and which is connected thereto at its axially outer end by an annular portion 39 of the plug. Preferably the plug or valve body is formed as an integral molding of a strong, rigid plastic material, although it may be formed of any one of a number of metals having desired strength and corrosion resistance properties. The radially inner surface of the nipple 20 and the radially outer surface of the inner skirt 37 of the plug or valve accurately interfit, as shown.

Integrally attached to the axially inner end of the inner skirt 37 is a transversely disposed multi-perforated inner end plate 40 which is also preferably formed as a part of the integral molding which forms the plug or valve body. The end plate 40 has a central hole 41 therein, hole 41 serving lockingly to receive a central tapered pin 44 on a diaphragm 42 the main body of which is formed as a disc of resilient rubberlike material such as neoprene. The tapered pin 44 has an annular undercut portion at its root which extends into and through the central hole 41 in the end plate 40 when the diaphragm is fully mounted thereon, the annular shoulder outwardly thereof at the larger end of the central tapered pin 44 snapping past the forward edges of the hole 41 when the diaphragm is fully mounted thereon as shown in FIG. 2.

When the plug or valve member of the device is in its fully closed position, as shown in FIG. 2, the outer rim portion 47 at the inner face of the diaphragm 42 sealingly engages the molded annular seat 46 which overlies the annular inner flange 29 on the nipple 20. In order to increase the local unit pressure exerted upon the diaphragm by the rim of the end plate 40 thereon, there is provided a shallow axially inwardly projecting annular bead 43 on the axially inner end of the inner skirt 37 of the plug, the bead 43 being positioned coaxial of the plug and of the diaphragm 42, and aligned with valve seat 46.

In FIG. 3, the device is shown with the plug or valve portion thereof partially retracted from the annular valve seat 46 and with an inflation fitting 49 applied to the hollow plug so as to introduce air under pressure through the inner skirt 37 of the plug, through the perforations in the end plate 40 thereon, and past the rim of the diaphragm 42 which is now free for deflection by the pressure air in a direction to the left so that the air can flow into the interior of the inflatable article. The fitting 49 is sealed to the outer end of an air inflation tube 50 which is connected to a source of pressure air (not shown). Fitting 49 has a circular cylindrical larger diametered portion 51 beyond the end of the part thereof attached to the air supply tube 50, and a smaller diametered circular cylindrical forward portion 52 having an annular bead 54 at its forward end. The diameter of portion 52 of the inflation fitting and the diameter of the bead 54 are such that when the portion 52 is thrust into the axially outer end of the inner skirt or sleeve 37 of the valve it makes sealing contact therewith. Further sealing between the inflation fitting and the valve is provided by engagement between the annular outer end portion 39 of the valve body and a flexible skirt 57 formed at the forward end of the body 51 of the inflation fitting by the provision of an annular groove 56 therein.

After the inflatable article has been inflated to the desired pressure, the inflating fitting 49 is withdrawn therefrom. Immediately thereafter, the diaphragm 42 is thrust to the right against the axially inner surface of the multiperforated end plate 40 of the valve by the pressure of the air within the inflatable article, thereby checking the escape of air from the inflatable article. If the pressure within the inflatable article is correct, the plug or valve may then be screwed in so as to move it to the left from the position shown in FIG. 3 into the fully closed position shown in FIG. 2.

Should the inflatable article have been inflated to an unduly high pressure, the pressure therein can be relieved by the local unseating of the diaphragm from the end plate 40 when the plug or valve is in the position thereof shown in FIG. 3. This is accomplished by the provision of a radially extending tab 59 having an axially outwardly extending button or post 60 thereon which can be engaged by a finger thrust within the inner skirt 37 of the plug. The tab 59 is hinged to the main portion of the multi-perforated end plate 40 by a plastic hinge 61, as shown. The outer end of the tab 59 is disposed radially inwardly of the axially inner end of the inner skirt 37 and of the annular bead 43 thereon, so that the sealing of the valve is not disturbed either when the valve element is in the fully closed position of FIG. 2, or when it is in the position thereof shown in FIG. 3 and functions as a check valve, as above-described, after the flow of air into the inflatable article through the tube 50 and the inflation fitting 49 has stopped.

The inflation device of the present invention also incorporates a novel tether, as indicated above, whereby the valve or plug 34 is retained attached to the insert or nipple 20 even though the valve has been fully unscrewed therefrom. Such tether, which is generally designated by the reference character 62, is made of flexible plastic material in sheet form and has a circular body made substantially of two concentric rings spaced radially from each other, as shown in FIG. 1. The inner ring 64 of the tether is generally separated from the outer ring 65 thereof by two oppositely disposed symmetrical part-circular slots 63 which extend completely around the rings with the exception of the zone of a radially extending tab 66 which secures the two rings together. At a location disposed 180° spaced angularly from the zone of the tab 66 there is provided a folded strap 67 one end of which is attached to the outer edge of the outer ring 65 and the other end of which is attached to the axially inner end of the outer skirt 35 of the body of the valve or plug. Preferably the tether including the inner end outer rings 64, 65, the tab 66, and the strap 67 are molded integrally with the body of the valve element or cap. The engagement between the inner ring 64 of the tether and the walls of the annular groove 25 in the hub 24 on the nipple 20 is such as to allow the free rotation of the tether with respect to the nipple.

Because of the symmetrical disposition of the inner and outer rings 64, 65, and of the tab 66 and the strip 67, there is no possibility of binding or twisting of the parts of the tether as the cap or valve element is turned. To ensure this condition, the rings, tab and strap of the tether have lateral dimensions which markedly exceed their thickness, whereby such parts are readily bent out of their planes but possess marked stiffness in their planes.

In FIG. 7 there is shown a further operation which is advantageously conducted by employment of the fitting 49. Here, it is assumed that the air within the inflatable article has been substantially exhausted from its interior by the removal of the plug or valve portion of the device. As is well-known, however, unless further steps are taken such as the local pressing or folding of the inflatable article, there remains a substantial amount of air within it so that the folding and storing of the article are difficult. To overcome this condition, the fitting 49 and the tube 50 connected thereto may be connected to a source (not shown) of reduced pressure (vacuum) and the portion 51 of the fitting 49 may then be thrust within the nipple 20 so that a substantial seal exists between the annular bead 58 on the end of the skirt 57 of the fitting. The last vestige of air then may be drawn out of the inflatable article through the nipple 20. The provision of the above-described annular boss 30 having the radial slots 31 therein prevents any portion of the interior of the inflatable article from being cut off from the source of reduced pressure by reason of sealing engagement of an opposite wall of the inflatable article with the inner end of the body 15 of the device.

Although the invention is illustrated and described with reference to a single preferred embodiment thereof, it is to be expressly understood that it is in no way limited to the disclosure of such a preferred embodiment, but is capable of numerous modifications within the scope of the appended claims. Thus although the device of the invention has been described as being used with an article inflated with a gas such as air, it is to be understood that it can also be used to advantage with articles which are filled or inflated with or which contain other fluid material such as liquids. One such use in on waterbeds. The terms "inflation device" and "inflatable article" employed herein are accordingly to be given an interpretation consistent with this paragraph.

What is claimed is:
1. An inflation device for an inflatable article, said device comprising a body having an annular flange adapted to be sealed to a wall of an inflatable article at an opening therethrough, a threaded tubular nipple disposed on the body, the nipple having a radially inwardly extending transverse annular flange thereon forming a transverse annular seat within the nipple, a tubular closure element applied to the outer free end of the nipple and having threaded engagement with the nipple, the closure element having a perforated partition extending across its axially inner end, and a flexible resilient imperforate diaphragm overlying the axially inner surface of the partition and centrally attached thereto, the annular outer edge of the diaphragm sealingly engaging the annular seat when the closure element is advanced into its axially inner closed position on the nipple.

2. A device according to claim 1, wherein the closure element has radially spaced concentric inner and outer skirts connected at their outer ends by an annular axially outer member, the partition being attached to and spanning the axial inner end of the inner skirt, the nipple being outwardly threaded, and the outer skirt being inwardly threaded, the threads on the nipple and on the outer skirt being threadedly engaged.

3. A device according to claim 1, comprising means for selectively thrusting a portion of the diaphragm axially inwardly away from the main part of the partition when the closure element has been retracted outwardly with respect to the nipple.

4. A device according to claim 3, wherein the means for selectively thrusting a portion of the diaphragm axially inwardly away from the partition comprises a tab-like portion of the partition which is hingedly mounted on the remainder thereof.

5. A device according to claim 4, wherein the tab-like portion of the partition extends generally radially of the partition and is hinged at its radially inner end to the main part of the partition.

6. A device according to claim 5, wherein the rim of the partition is unbroken, and the radially outer end of the tab-like portion of the partition lies close to the rim of the partition.

7. A device according to claim 2, wherein the closure element functions as an inflation check valve when it is retracted from its axially inner, closed position, the outer surface of the inner skirt being circular cylindrical and substantially sealingly engaging the circular cylindrical inner surface of the nipple, and article inflating air under pressure is introduced through the inner skirt of the closure element.

8. A device according to claim 7, wherein the closure element can be completely removed from the nipple, and wherein air can thereafter be removed from the inflatable article through the nipple.

* * * * *